(12) United States Patent
Achiwa

(10) Patent No.: US 10,389,912 B2
(45) Date of Patent: Aug. 20, 2019

(54) IMAGE PROCESSING APPARATUS AND METHOD FOR CONTROLLING IMAGE PROCESSING APPARATUS

(71) Applicant: CANON KABUSHIKI KAISHA, Tokyo (JP)

(72) Inventor: Ken Achiwa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/356,391

(22) Filed: Nov. 18, 2016

(65) Prior Publication Data

US 2017/0155799 A1 Jun. 1, 2017

(30) Foreign Application Priority Data

Nov. 28, 2015 (JP) ................ 2015-232519

(51) Int. Cl.
| | | |
|---|---|---|
| G06F 15/00 | (2006.01) | |
| H04N 1/41 | (2006.01) | |
| G06K 15/02 | (2006.01) | |
| H04N 1/21 | (2006.01) | |

(52) U.S. Cl.
CPC ............ *H04N 1/41* (2013.01); *G06K 15/184* (2013.01); *G06K 15/1813* (2013.01); *G06K 15/1817* (2013.01); *H04N 1/2104* (2013.01); *H04N 2201/0094* (2013.01)

(58) Field of Classification Search
CPC .... H04N 1/41; H04N 1/2104; G06K 15/1813; G06K 15/1817; G06K 15/184
USPC ......................................................... 358/1.16
See application file for complete search history.

(56) References Cited

U.S. PATENT DOCUMENTS

| | | | | |
|---|---|---|---|---|
| 5,999,710 A | * | 12/1999 | Smith ................ | G06K 15/12 358/1.13 |
| 2014/0071463 A1 | * | 3/2014 | Achiwa .............. | G06K 15/1861 358/1.5 |
| 2015/0242720 A1 | * | 8/2015 | Kitaguchi .......... | G06K 15/1886 358/1.13 |

FOREIGN PATENT DOCUMENTS

JP 2014-53822 A 3/2014

* cited by examiner

*Primary Examiner* — Mark R Milia
(74) *Attorney, Agent, or Firm* — Canon U.S.A., Inc. I.P. Division

(57) ABSTRACT

Image processing apparatuses, methods and storage mediums for use with same are provided herein. In at least one embodiment, an image processing apparatus makes a setting to use a storing unit as a decompression buffer and a compression buffer based on drawing data including compressed image data, and makes a setting not to use the storing unit as a decompression buffer but to use the storing unit as a compression buffer based on drawing data not including compressed image data.

13 Claims, 6 Drawing Sheets

IMAGE PROCESSING APPARATUS AND METHOD FOR CONTROLLING IMAGE PROCESSING APPARATUS

BACKGROUND

Field of the Disclosure

The present disclosure relates to an image processing technique for handling compressed image data.

Description of the Related Art

An image processing apparatus represented by a multi function peripheral (MFP) includes a plurality of processing units such as a drawing processing unit, a compression processing unit, and a decompression processing unit. In the plurality of processing units, a pipeline processing configuration in which output data from one processing unit is input to another processing unit has been adopted. In the pipeline processing, when a local memory is provided as a buffer between the processing unit from which data is to be output and the processing unit to which data is to be input, even if there occurs a difference between the respective processing speeds of the processing units, the difference is absorbed. Japanese Patent Application Laid-Open No. 2014-53822 discusses a technique for changing the capacity of the local memory depending on whether image data to be processed is in color or in monochrome.

In the image processing apparatus, a series of processing, described below, is performed. When the drawing processing unit performs drawing processing based on drawing data to generate image data in a bit map format, if the drawing data includes compressed image data, the decompression processing unit decompresses the compressed image data and stores the decompressed image data in a first local memory. The drawing processing unit performs drawing processing using the decompressed image data stored in the first local memory. At this time, the drawing processing unit stores image data generated by the drawing processing in a second local memory. Then, the compression processing unit compresses the image data stored in the second local memory using an encoding method such as Joint Photographic Experts Group (JPEG) encoding. At this time, the compression processing unit stores the compressed image data in a main memory such as a dynamic random access memory (DRAM).

Conventionally, a capacity of the first local memory to be allocated has been fixed regardless of whether drawing data includes compressed image data. Therefore, if the drawing data does not include the compressed image data, the first local memory is not used. Thus, memory resources have not been efficiently used.

SUMMARY

According to an aspect of at least one embodiment of the present disclosure, an image processing apparatus includes a storing unit, a setting unit configured to make a setting to use the storing unit as a decompression buffer and a compression buffer based on compressed image data being included in drawing data and make a setting not to use the storing unit as a decompression buffer but to use the storing unit as a compression buffer based on compressed image data not being included in drawing data, a decompression processing unit configured to decompress compressed image data included in drawing data and store the decompressed image data in the decompression buffer, and a compression processing unit configured to compress image data stored in the compression buffer and output the compressed image data.

According to other aspects of the present disclosure, one or more additional image processing apparatuses, one or more image processing methods, and one or more storage mediums for use with same are discussed herein. Further features of the present disclosure will become apparent from the following description of exemplary embodiments with reference to the attached drawings.

DESCRIPTION OF THE EMBODIMENTS

Figure 1:
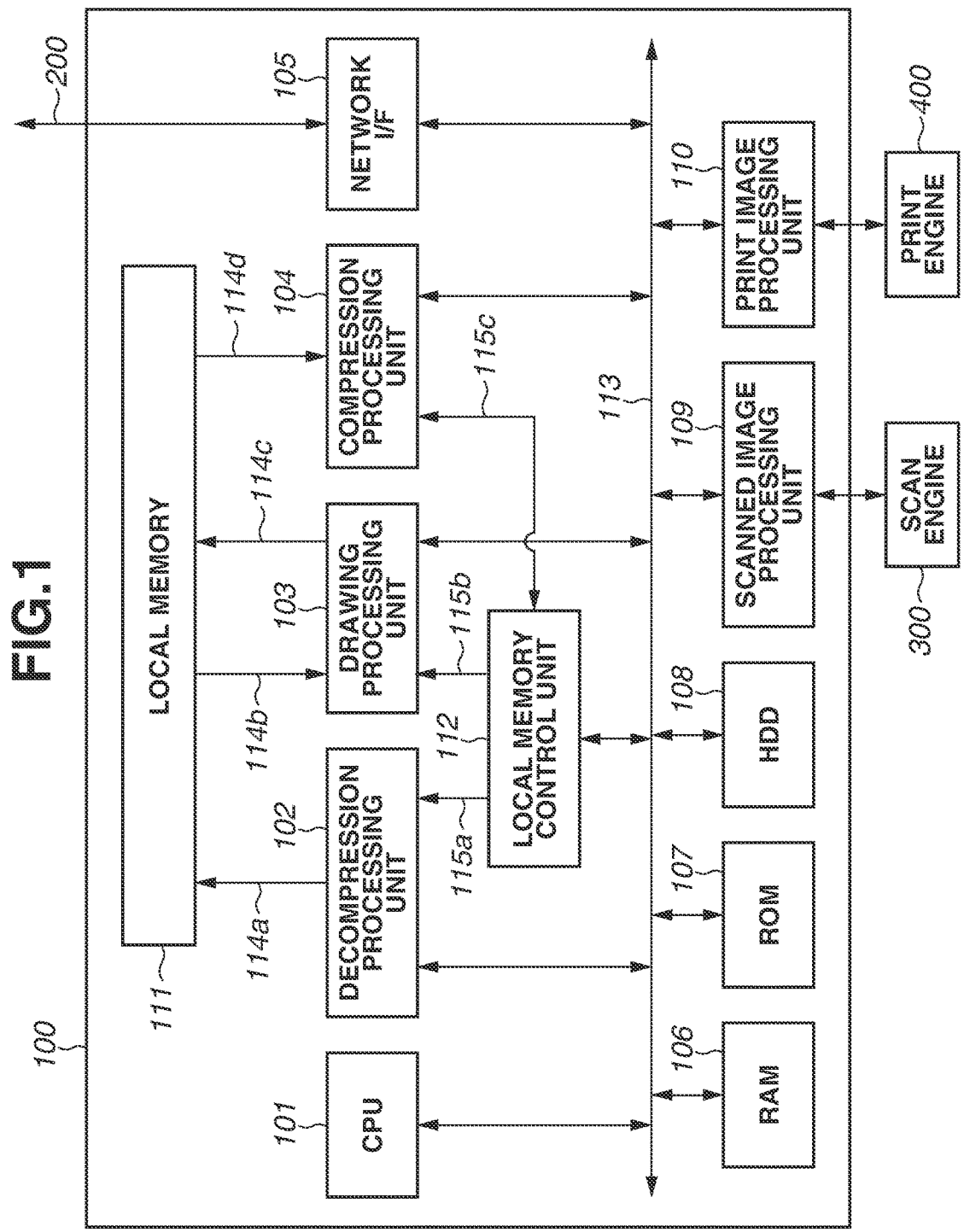
FIG. 1 is a block diagram illustrating a configuration of a controller in an image processing apparatus.

FIG. 1 is a block diagram illustrating a configuration of a controller in a multifunction peripheral (MFP) serving as an exemplary embodiment of an image processing apparatus according to the present disclosure. The image processing apparatus according to the present disclosure may be a single function printer (SFP). The MFP according to the present exemplary embodiment will be simply referred to as an image processing apparatus hereinafter. As illustrated in FIG. 1, the image processing apparatus includes a controller 100, a network 200, a scan engine 300, and a print engine 400.

The network 200 is a communication path which is implemented by a local area network (LAN) or a wide area network (WAN) and transmits and receives image data and device information between an external apparatus such as a host computer or a server and the image processing apparatus.

The scanner engine 300 is an image input device and serves as a processing unit that accepts image data into the image processing apparatus using an optical sensor.

The print engine 400 is an image output device and prints the image data in the image processing apparatus on a recording medium such as a sheet. The print engine 400 may use an electrophotographic method, an inkjet method, or other methods.

The controller 100 is a control unit that is connected to the network 200, the scan engine 300, and the print engine 400 and controls the entire image processing apparatus. In the controller 100, a central processing unit (CPU) 101, a decompression processing unit 102, a drawing processing unit 103, a compression processing unit 104, a network interface (I/F) 105, a random access memory (RAM) 106, a hard disk drive (HDD) 108, a scanned image processing unit 109, and a print image processing unit 110 are connected to one another via a system bus 113.

The CPU 101 is a processing unit that controls the entire image processing apparatus. The CPU 101 particularly interprets Page Description Language (PDL) data, which has been received from the external apparatus via the network 200, and converts the interpreted PDL data into drawing data (a display list (DL)) having a plurality of drawing object information constituting a page in PDL print processing. In this stage, the drawing data is represented in a vector data format before being rasterized. The conversion into the drawing data is also referred to as generation of the drawing data, and the drawing data is generated for each page. The generated drawing data is stored for each page in the RAM 106.

The decompression processing unit 102 is an image decompression device called an image decompressor or an image decoder. The decompression processing unit 102 performs decompression processing (decoding processing) on image data which has been compressed using an encoding method such as JPEG encoding, Run Length encoding, or Modified Modified Read (MMR) encoding, to generate uncompressed image data in a raster data format such as a bit map.

The drawing processing unit 103 is a Raster Image Processor (RIP). The drawing processing unit 103 converts the drawing data (DL) in a vector data format, which has been generated from the PDL data by the CPU 101, into image data in a raster data format by rasterization. The conversion into the image data in a raster data format is also referred to as drawing processing performed on the drawing data. The drawing processing unit 103 can perform the drawing processing using not only the drawing data in a vector data format but also the drawing data in a raster data format.

The compression processing unit 104 is an image compression device called an image compressor or an image encoder. The compression processing unit 104 performs compression processing (encoding processing) for uncompressed image data in a raster data format, to generate image data that has been compressed using an encoding method such as JPEG encoding, Run Length encoding, or MMR encoding.

The network I/F 105 is an interface unit which is implemented by a local area network (LAN) card, for example, and transmits and receives image data and device information between the external apparatus such as the host computer or the server and the image processing apparatus via the network 200.

The RAM 106 is a nonvolatile memory such as a dynamic random access memory (DRAM), and is a storage unit used as a work area for the CPU 101 to operate on a system or a buffer area for temporarily storing image data. The buffer area also stores drawing data. The ROM 107 is a nonvolatile memory such as an erasable programmable read only memory (EPROM), and is a storage unit storing a boot program for the CPU 101 to start the system. The HDD 108 is a hard disk drive, and is mainly a large-capacity storage unit for storing image data in the image processing apparatus.

The scanned image processing unit 109 is connected to the scan engine 300 serving as a scanner via a serial bus. The connection may be implemented by a parallel bus. The scanned image processing unit 109 is an image processing unit that performs image processing to correct image data input from the scan engine 300, based on a device characteristic of the scan engine 300. The scanned image processing unit 109 is a processing unit having a function of compressing the image data input from the scan engine 300, and then transferring the compressed image data by a transmission unit since the input image data is handled using limited memory capacity and system bus band in the controller 100.

The print image processing unit 110 is connected to the print engine 400 serving as a printer via a serial bus. The connection may be implemented by a parallel bus. The print image processing unit 110 performs decompression processing on compressed image data stored in the RAM 106. The print image processing unit 110 handles the compressed image data, and can thus efficiently utilize the limited memory capacity and system bus band in the controller 100. The print image processing unit 110 is an image processing unit that performs image processing for correcting decompressed image data based on a device characteristic of the print engine 400 and outputs the processed image data to the print engine 400.

The local memory 111 is implemented by a static random access memory (SRAM), and is connected to the decompression processing unit 102, the image processing unit 103, and the compression processing unit 104, respectively, via a signal line 114*a*, signal lines 114*b* and 114*c*, and a signal line 114*d*. The decompression processing unit 102 stores the generated image data (decompressed image data) in the local memory 111 via the signal line 114*a*. The drawing processing unit 103 acquires the decompressed image data, which has been stored in the local memory 111, via the signal line 114*b*, and stores the image data, on which the drawing processing has already been performed, in the local memory 111 via the signal line 114*c*. The compression processing unit 104 acquires the image data, which the drawing processing has already been performed thereon and stored in the local memory 111 via the signal line 114*d*. While the two signal lines 114*b* and 114*c* are used in the present exemplary embodiment, one signal line may be used in substitution for the signal lines 114*b* and 114*c* in the present exemplary embodiment.

Thus, the local memory 111 functions as a buffer memory (a decompression buffer) temporarily storing uncompressed image data which has been decompressed by the decompression processing unit 102 and a buffer memory (a compression buffer) temporarily storing uncompressed image data, which has been subjected to drawing processing by the drawing processing unit 103, for compression processing.

The local memory 111 includes a first storage unit 1111 and a second storage unit 1112, described below. The first storage unit 1111 and the second storage unit 1112 are respectively storage areas corresponding to different addresses in the local memory 111. In the present exemplary embodiment, the first storage unit 1111 is a storage area in a first address range from an address [XXXX] to an address [YYYY-1] in the local memory 111. The second storage unit 1112 is a storage area in a second address range from an address [YYYY] to an address [ZZZZ-1] in the local memory 111.

A local memory control unit 112 is connected to the decompression processing unit 102, the drawing processing unit 103, and the compression processing unit 104, respectively, via signal lines 115*a*, 115*b*, and 115*c*. The local memory control unit 112 includes a processor and a register (not illustrated). The local memory control unit 112 stores control information, which has been transmitted from the CPU 101 via the system bus 113, in the register, to control assignment of a storage area in the local memory 111. The control information is information representing respective operation modes of the decompression processing unit 102, the drawing processing unit 103, and the compression processing unit 104. The local memory control unit 112 sets the operation modes represented by the control information stored in the register in the processing units 102, 103, and 104, respectively, via the signal lines 115a, 115b, and 115c. In the present exemplary embodiment, the operation mode includes two modes, described below.

The first operation mode (operation mode A) is an operation mode in which the first storage unit 1111 and the second storage unit 1112 are respectively used as a decompression buffer and a compression buffer. In the operation mode A, the decompression processing unit 102, the drawing processing unit 103, and the compression processing unit 104 are configured to operate, as described below. Each of the decompression processing unit 102 and the drawing processing unit 103 performs processing while using the first storage unit 1111 as a decompression buffer. Each of the decompression processing unit 103 and the compression processing unit 104 performs processing while using the second storage unit 1112 as a compression buffer.

The second operation mode (operation mode B) is an operation mode in which the first storage unit 1111 and the second storage unit 1112 are used as compression buffers. In the operation mode B, the decompression processing unit 102, the drawing processing unit 103, and the compression processing unit 104 are configured to operate, as described below. The decompression processing unit 102 does not start the processing, and each of the drawing processing unit 103 and the compression processing unit 104 performs the processing while using the first storage unit 1111 and the second storage unit 1112 as compression buffers.

One of effects of the present exemplary embodiment is that memory resources of the local memory 111 can be effectively utilized by appropriately setting the two operation modes described above. The operation modes are set, as described below, according to a flowchart of FIG. 4.

The system bus 113 connects the processing units constituting the controller 100 to one another, and transmits and receives image data and control information such as an instruction to start the processing among the processing units.

An assignment control of a storage area in the local memory 111 during drawing processing in a PDL print function of the image processing apparatus (setting of an operation mode) in two cases (described below), will be described below with reference to FIGS. 2 and 3. The following is a point. If drawing data (DL) stored in the RAM 106 includes compressed image data, each of the processing units operates in the above described operation mode A. If the drawing data stored in the RAM 106 does not include compressed image data, each of the processing units operates in the above described operation mode B.

<Case where Drawing Data Includes Compressed Image Data>

Figure 2:
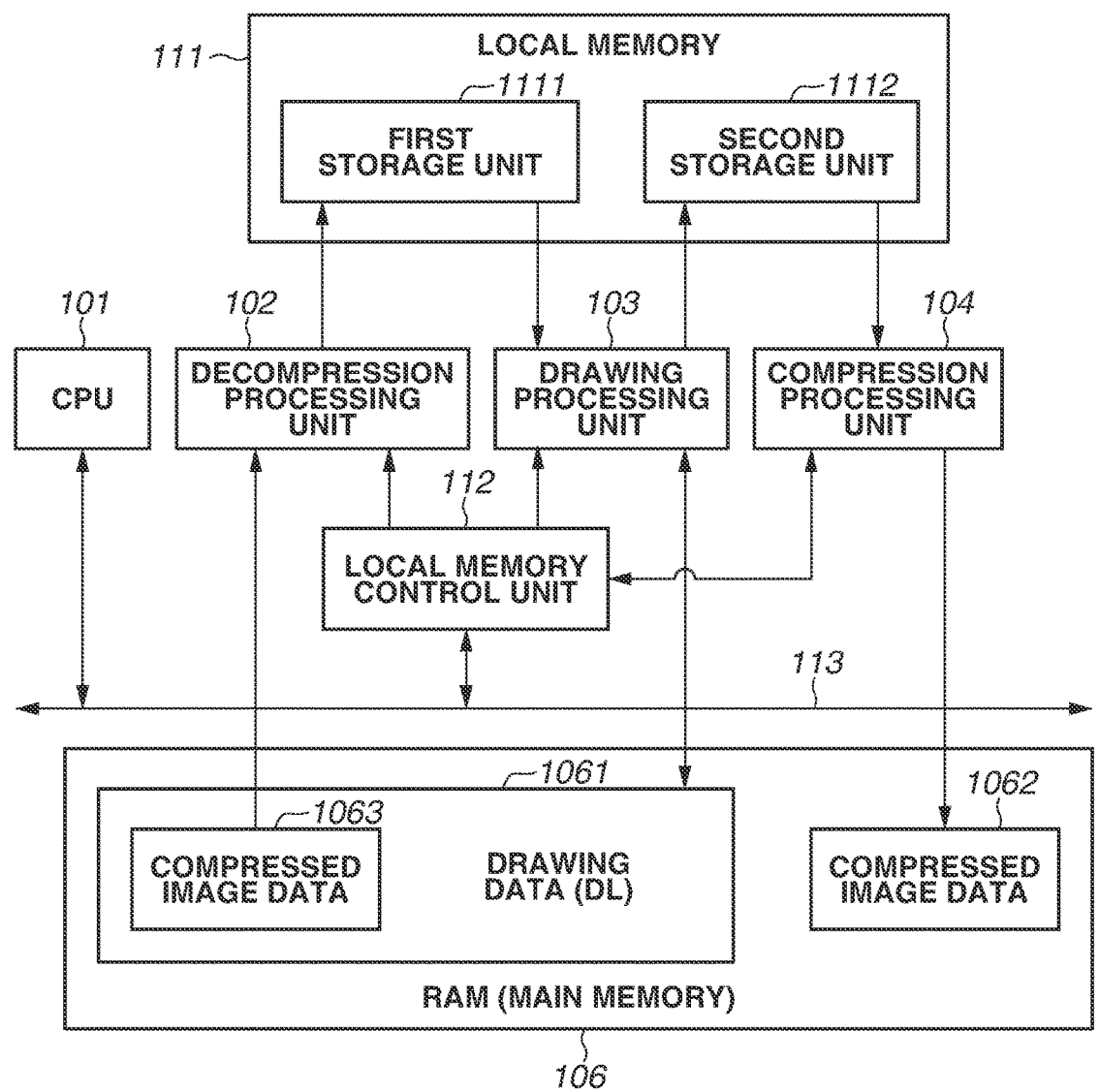
FIG. 2 is a block diagram illustrating drawing processing performed when drawing data includes compressed image data.

FIG. 2 illustrates an assignment control of a storage area in the local memory 111, which is performed when drawing data 1061 stored in the RAM 106 serving as a main memory includes compressed image data 1063 for a page serving as a drawing target generated by converting PDL data. In FIG. 2, respective storage areas in the local memory 111 and the RAM 106 in the controller 100 illustrated in FIG. 1 are detailed so that the storage area used during drawing processing can be found. A series of drawing processing performed from the time point where the CPU 101 has stored the drawing data 1061 generated based on the PDL data in the RAM 106 to the time point where the drawing processing unit 103 generates compressed image data 1062 using the drawing data 1061 on the RAM 106 as an input will be described with reference to FIG. 2.

First, the CPU 101 detects that drawing data 1061 corresponding to one page stored in the RAM 106 includes compressed image data 1063 processed using an encoding method such as JPEG encoding in a period from the time point where the drawing data 1061 corresponding to one page has been generated to the time point where drawing processing is started. A detection method will be described in step S403 in a flowchart of FIG. 4, described below.

The CPU 101 then stores control information representing the operation mode A in an internal register of the local memory control unit 112 via the system bus 113 based on compressed image data being included in drawing data. Consequently, the local memory control unit 112 sets the operation mode A in the processing units (the decompression processing unit 102, the drawing processing unit 103, and the compression processing unit 104), respectively, via the signal lines 115a, 115b, and 115c.

In other words, in this case, such a setting is made that the first storage unit 1111 is used as a decompression buffer between the decompression processing unit 102 and the drawing processing unit 103 and the second storage unit 1112 is used as a compression buffer between the drawing processing unit 103 and the compression processing unit 104.

The CPU 101 then instructs each of the decompression processing unit 102, the drawing processing unit 103, and the compression processing unit 104 to start processing. Consequently, the decompression processing unit 102 and the drawing processing unit 103 start decompression processing, drawing processing, and compression processing based on the drawing data 1061 corresponding to one page stored in the RAM 106.

More specifically, the decompression processing unit 102 performs decompression (decoding) processing on the compressed image data 1063 included in the drawing data 1061 stored in the RAM 106. The decompression processing unit 102 temporarily stores uncompressed image data obtained by the decompression processing in the first storage unit 1111. The drawing processing unit 103 performs drawing processing based on the drawing data 1061 corresponding to one page stored in the RAM 106. In the drawing processing, the drawing processing unit 103 acquires the uncompressed image data, which has been temporarily stored in the first storage unit 1111, as a drawing object, and uses the acquired uncompressed image data. The first storage unit 1111 is thus prepared as a decompression buffer. Therefore, even if a difference occurs between the processing speed of the decompression processing unit 102 and the processing speed of the drawing processing unit 103, the difference can be absorbed.

The decompression processing unit 103 temporarily stores the uncompressed image data obtained by the above described drawing processing in the second storage unit 1112. The compression processing unit 104 performs compression (encoding) processing on the uncompressed image data that has been temporarily stored in the second storage unit 1112. The compression processing unit 104 stores the compressed image data 1062 obtained by the compression processing in the RAM 106. The second storage unit 1112 is thus prepared as a compression buffer. Therefore, even if a difference occurs between the processing speed of the drawing processing unit 103 and the processing speed of the compression processing unit 104, the difference can be absorbed.

<Case where Drawing Data does not Include Compressed Image Data>

Figure 3:
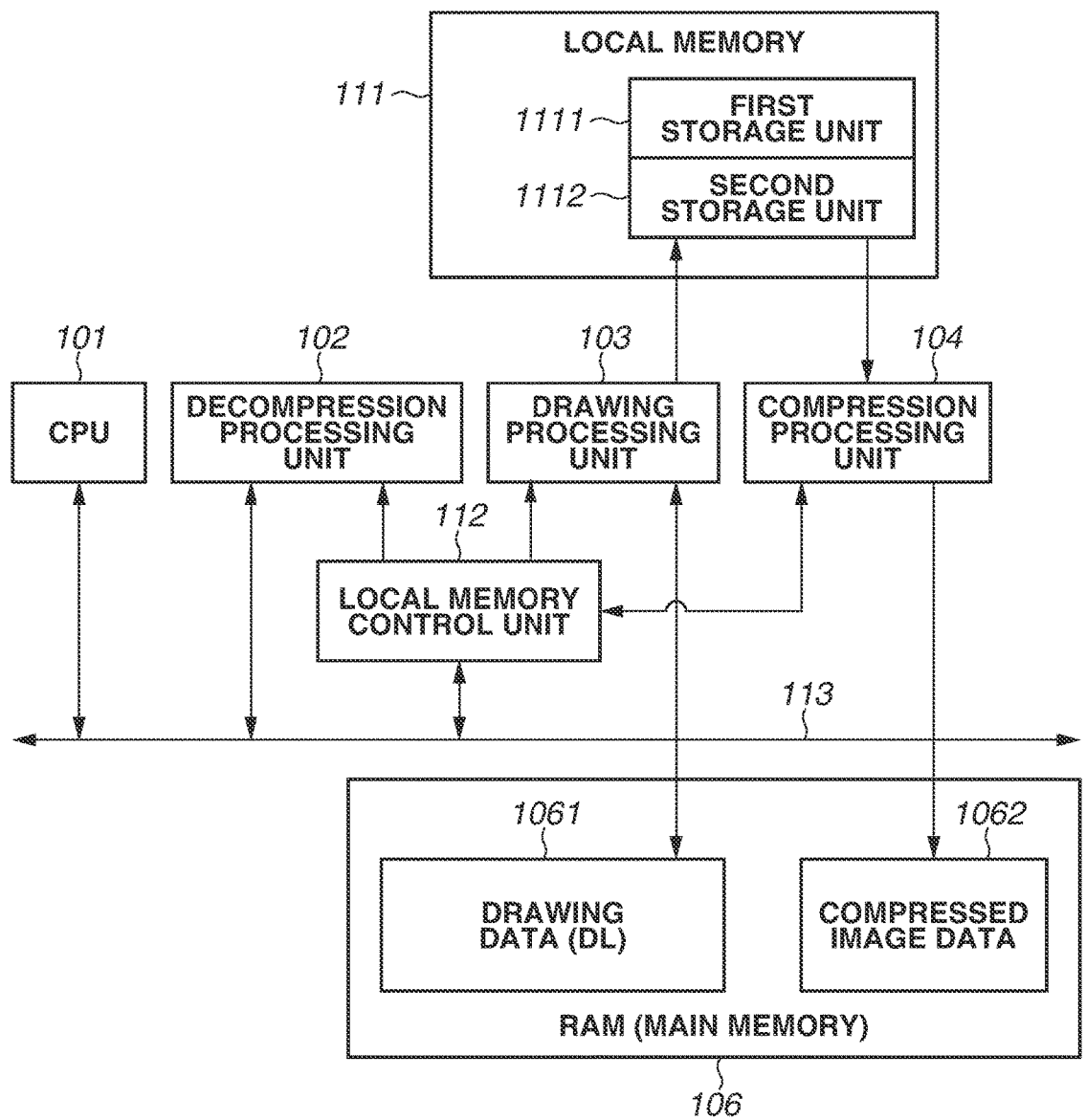
FIG. 3 is a block diagram illustrating drawing processing performed when drawing data does not include compressed image data.

FIG. 3 illustrates an assignment control of a storage area in the local memory 111, which is performed when drawing data 1061 stored in the RAM 106 serving as a main memory does not include compressed image data 1063 on a page serving as a drawing target generated by converting PDL data. In FIG. 3, respective storage areas in the local memory 111 and the RAM 106 in the controller 100 illustrated in FIG. 1 are detailed so that the storage area used during drawing processing can be found. A series of drawing processing performed from the time point where the CPU 101 has stored the drawing data 1061 generated based on the PDL data in the RAM 106 to the time point where the drawing processing unit 103 generates compressed image data 1062 using the drawing data 1061 on the RAM 106 as an input will be described with reference to FIG. 3.

First, the CPU 101 detects that drawing data 1061 corresponding to one page stored in the RAM 106 does not include compressed image data 1063 processed using an encoding method such as JPEG encoding in a period from the time point where the drawing data 1061 corresponding to one page has been generated to the time point where drawing processing is started. A detection method will be described in step S403 in a flowchart of FIG. 4, described below.

The CPU 101 then stores control information representing the operation mode B in an internal register of the local memory control unit 112 via the system bus 113 based on compressed image data not being included in drawing data. Consequently, the local memory control unit 112 sets the operation mode B in the processing units (the decompression processing unit 102, the drawing processing unit 103, and the compression processing unit 104), respectively, via the signal lines 115a, 115b, and 115c.

In other words, in this case, such a setting is made that the first storage unit 1111 and the second storage unit 1112 are used as compression buffers between the drawing processing unit 103 and the compression processing unit 104.

The CPU 101 then instructs each of the decompression processing unit 102, the drawing processing unit 103, and the compression processing unit 104 to start processing. Consequently, the drawing processing unit 103 starts drawing processing and compression processing based on the drawing data 1061 corresponding to one page stored in the RAM 106. The drawing data does not include compressed image data. Eventually, the decompression processing unit 102 does not perform decompression processing.

More specifically, the drawing processing unit 103 performs drawing processing on the drawing data 1061 corresponding to one page stored in the RAM 106. The decompression processing unit 103 temporarily stores uncompressed image data obtained by the drawing processing in the first storage unit 1111 and the second storage unit 1112 in the local memory 111. In the storage, the drawing processing unit 103 stores the uncompressed image data in a free portion of each of the first storage unit 1111 and the second storage unit 1112 serving as the storage areas. The compression processing unit 104 then performs compression (encoding) processing on the uncompressed image data that has been temporarily stored in the first storage unit 1111 and the second storage unit 1112 in the local memory 111. In other words, the first storage unit 1111 and the second storage unit 1112 function as compression buffers. The compression processing unit 104 stores the compressed image data 1062 obtained by the compression processing in the RAM 106.

Not only the second storage unit 1112 but also the first storage unit 1111 can be thus used as a temporary storage area for uncompressed image data. Therefore, memory resources of the local memory 111 can be efficiently used. The larger the capacity of a compression buffer is, the higher the capability of absorbing a variation in processing speed difference between drawing processing and compression processing is. Therefore, in the present exemplary embodiment in which not only the second storage unit 1112 but also the first storage unit 1111 is used as a compression buffer, a decrease in performance caused by a small capacity of the compression buffer can be suppressed.

<PDL Print Processing>

Figure 4:
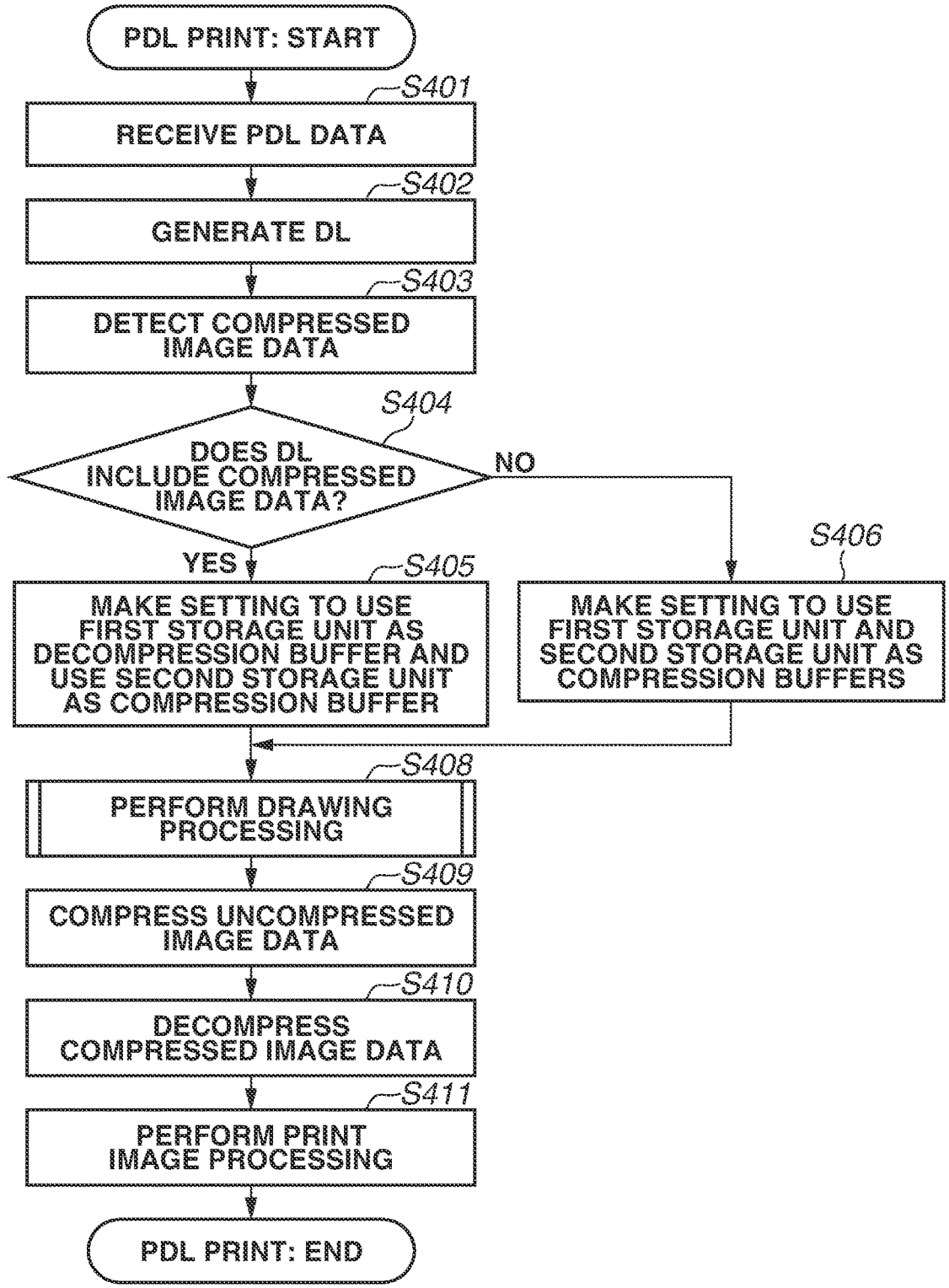
FIG. 4 is a flowchart illustrating Page Description Language (PDL) print processing.
Figure 5:
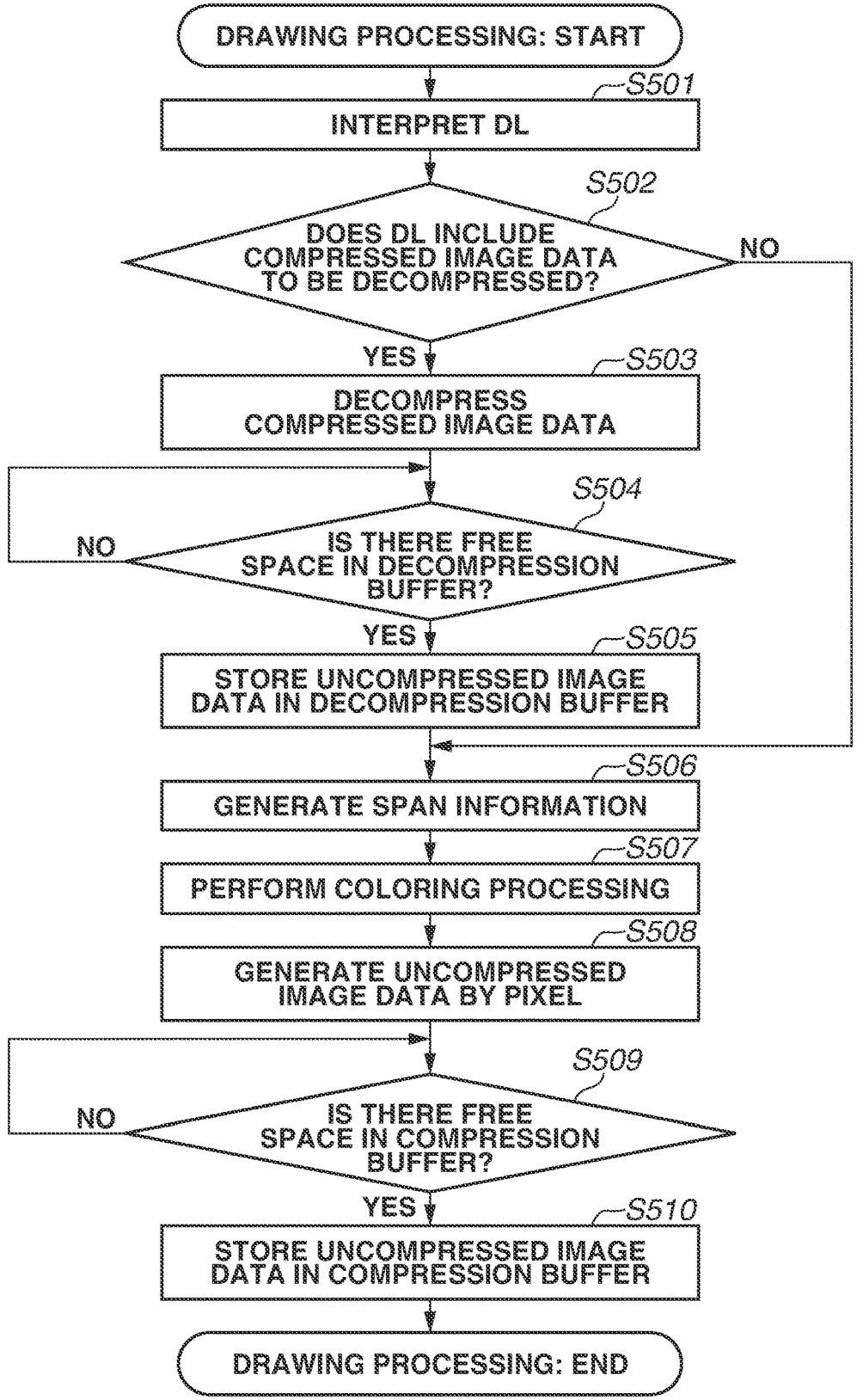
FIG. 5 is a flowchart illustrating drawing processing.

Respective flows of PDL print processing and drawing processing relating to the assignment control of the storage area in the local memory 111 in the image processing apparatus according to the present exemplary embodiment will be described below with reference to flowcharts of FIGS. 4 and 5, respectively.

A processing flow of the PDL print processing will be first described with reference to FIG. 4. The flow illustrated in FIG. 4 is performed for each page. That is, an operation mode is set by page.

In step S401, the CPU 101 receives PDL data, which has been transmitted onto the network 200 from the host computer or the server, in the controller 100 in the image processing apparatus via the network I/F 105, and stores the received PDL data in the HDD 108.

In step S402, the CPU 101 then transfers the PDL data stored in the HDD 108 to the RAM 106, converts the PDL data into drawing data (DL), and stores the drawing data in the RAM 106. The conversion is performed in the following manner. The CPU 101 sequentially converts one or more PDL commands included in the PDL data, one by one, into drawing data (drawing commands), and stores the drawing data obtained by the conversion in the RAM 106. If the total data size of the drawing data so far generated and stored in the RAM 106 during conversion (generation) of drawing data corresponding to one page exceeds a threshold value, a series of processing (fallback processing), described below, is performed. In other words, if the total data size of the drawing data obtained based on a part of the PDL data exceeds the threshold value, the following fallback processing is performed. The drawing processing unit 103 performs drawing processing on the drawing data, which has already been stored in the RAM 106, to generate a bit map handled as a background image on the page in the local memory 111 (the first storage unit 1111 and the second storage unit 1112). The compression processing unit 104 performs compression processing for the bit map generated in the local memory 111, to generate compressed image data corresponding to the background image on the page and store the generated compressed image data in the RAM 106. The stored compressed image data is handled as being included in the drawing data. The CPU 101 gives flag information indicating that the drawing data includes the compressed image data corresponding to the background image (a fallback flag ON) to the drawing data stored in the RAM 106. The CPU 101 continuously converts remaining PDL commands included in the PDL data (the remaining part of the PDL data).

If the drawing data on the page is generated in the RAM 106 without the above described fallback processing being performed, the CPU 101 performs the following processing. The CPU 101 gives flag information indicating that the drawing data does not include the compressed image data corresponding to the background image (a fallback flag OFF) to the drawing data stored in the RAM 106.

In step S403, the CPU 101 then detects (determines) whether the drawing data, which has been generated in step S402, includes compressed image data.

As a detection method, the presence or absence (the number) of a decompression command(s) corresponding to a drawing object such as a picture obtained by an encoding method such as JPEG encoding may be detected by analyzing a PDL command during generation of drawing data, for example.

As another detection method, it may be detected whether drawing data includes compressed image data corresponding to a background image using an encoding method such as JPEG encoding by referring to the above described flag information to be given to the drawing data, for example.

As still another detection method, the presence or absence of decompression processing for a drawing object using an encoding method such as JPEG encoding may be detected depending on the presence or absence of cancellation of reset of access to a register for controlling the start-up of the decompression processing unit 102, for example.

As a further detection method, the presence or absence of decompression processing for a drawing object using an encoding method such as JPEG encoding may be detected by reading an internal status after setting a register for controlling the start-up of the decompression processing unit 102, for example.

In step S404, the CPU 101 determines whether the drawing data includes the compressed image data according to a detection result (determination result) in step S403. If the drawing data includes the compressed image data (YES in step S404), the processing proceeds to step S405. If the drawing data does not include the compressed image data (NO in step S404), the processing proceeds to step S406.

In step 405, the CPU 101 then makes a setting to use the first storage unit 1111 as a decompression buffer and use the second storage unit 1112 as a compression buffer. More specifically, the CPU 101 stores the control information representing the operation mode A in the internal register of the local memory control unit 112. The local memory control unit 112 sets the corresponding operation mode (operation mode A) in the processing units (the decompression processing unit 102, the drawing processing unit 103, and the compression processing unit 104), respectively, via the signal lines 115*a*, 115*b*, and 115*c* according to the stored control information. The operation of each of the processing units by the setting is as described in <Case where drawing data includes compressed image data>.

On the other hand, in step 406, the CPU 101 makes a setting to respectively use the first storage unit 1111 and the second storage unit 1112 as compression buffers. More specifically, the CPU 101 stores the control information representing the operation mode B in the internal register of the local memory control unit 112. The local memory control unit 112 sets the corresponding operation mode (operation mode B) in the processing units (the decompression processing unit 102, the drawing processing unit 103, and the compression processing unit 104), respectively, via the signal lines 115*a*, 115*b*, and 115*c* according to the stored control information. The operation of each of the processing units by the setting is as described in <Case where drawing data does not include compressed image data>.

In other words, if (it is determined that) the drawing data includes the compressed image data by a series of processing in step S403, step S404 (YES), and step S405, the CPU 101 makes a setting to secure the buffers in the assignment control of the local memory 111 as storage areas illustrated in FIG. 2. On the other hand, if (it is determined that) the drawing data does not include the compressed image data by a series of processing in step S403, S404 (NO), and steps S406, the CPU 101 makes a setting to secure the buffers in the assignment control of the local memory 111 as storage areas illustrated in FIG. 3.

In step S408, the CPU 101 then instructs each of the decompression processing unit 102 and the drawing processing unit 103 to start processing. Consequently, the drawing processing unit 103 starts drawing processing on the drawing data that has been stored in the RAM 106 in step S402. The drawing processing unit 103 performs drawing processing on a plurality of drawing objects constituting a single page using the drawing data as input data, and temporarily stores uncompressed image data serving as a drawing processing result in the compression buffer in the local memory 111 which has been secured in step S405 or S406. A processing flow of the drawing processing in step S408 will be specifically described separately with reference to FIG. 5.

In step S409, the CPU 101 then instructs the compression processing unit 104 to start processing. Consequently, the compression processing unit 104 performs compression processing on the uncompressed image data serving as the result of the drawing processing, which has been performed in step S408, to generate compressed image data, and stores the compressed image data in the RAM 106.

In step S410, the CPU 101 then instructs the print image processing unit 110 to start image processing. Consequently, the print image processing unit 110 acquires the compressed image data, which has been stored in the RAM 106, and performs decompression (decoding) processing on the acquired compressed image data.

In step S411, the print image processing unit 110 then performs print image processing to correct the decompressed image data based on a device characteristic of the print engine 400, and outputs the image data on which the print image processing has been performed to the print engine 400. The print engine 400 prints an image on a recording medium based on the output image data.

<Flow of Drawing Processing>

A processing flow of the drawing processing performed in step S408 in the PDL print processing illustrated in FIG. 4 will be described below with reference to FIG. 5.

In step S501, the drawing processing unit 103 analyzes a drawing command included in drawing data stored in the RAM 106. The drawing processing unit 103 then determines whether a decompression command corresponding to a drawing object such as a picture obtained by an encoding method such as JPEG encoding is included as the drawing command that has been interpreted in step S501. In the determination, it is determined that the drawing data includes compressed image data if the decompression command is included, and it is determined that the drawing data does not include compressed image data if the decompression command is not included.

Alternatively, the drawing processing unit 103 determines whether flag information in drawing data on a page serving as an interpretation target in step S501 indicates that the drawing data includes compressed image data corresponding to a background image. In the determination, it is determined that the drawing data includes the compressed image data if the flag information indicates that the drawing data includes the compressed image data corresponding to the background image, and it is determined that the drawing data does not include the compressed image data if the flag information does not indicate that the drawing data includes the compressed image data corresponding to the background image.

In step S502, the drawing processing unit 103 determines whether the drawing data includes compressed image data to be decompressed. If the drawing data includes the compressed image data to be decompressed (YES in step S502), the processing proceeds to step S503. If the drawing data does not include the compressed image data to be decompressed (NO in step S503), the processing proceeds to step S506.

In step S503, the decompression processing unit 102 then performs decompression processing on the compressed image data included in the drawing data in cooperation with the drawing processing unit 103.

In step S504, the decompression processing unit 102 then detects whether there is a free area in the decompression buffer which has been secured in step S405. If there is a free area (YES in step S504), the processing proceeds to step S505. If there is no free area (NO in step S504), the processing of step S504 is repeated, again. In step S504, the CPU 101 waits until a free area is formed. No free area means that the decompression buffer is filled with decompressed image data (uncompressed image data) which has not yet been transmitted to the drawing processing unit 103.

In step S505, the decompression processing unit 102 then stores the uncompressed image data on which the decompression processing has been performed, in the decompression buffer in the local memory 111 secured in step S405.

In step S506, the drawing processing unit 103 then detects a drawing object serving as a drawing target for each scan line based on the drawing command included in the drawing data, generates length information indicating a length in a main scanning direction of the drawing object, and retains the generated length information as span information.

In step S507, the drawing processing unit 103 then performs coloring processing on the drawing object according to the span information, which has been generated in step S506, and retains the drawing object on which the coloring processing has been performed, as fill information. If the drawing object is compressed image data, for example, the drawing processing unit 103 performs the decompression processing in step S503, and acquires the image data that has been stored in the decompression buffer in step S505.

In step S508, the drawing processing unit 103 then refers to the fill information, which has been retained in step S507, and performs composite processing using Raster Operation (ROP) according to level information representing a vertical relationship (Z-order) of drawing objects. In step S508, the drawing processing unit 103 sequentially generates uncompressed image data by page, by pixel, and outputs the generated uncompressed image data to the local memory 111.

In step S509, the drawing processing unit 103 then detects whether there is a free area in the compression buffer which has been secured in step S405 or S406. If there is a free area (YES in step S509), the processing proceeds to step S510. If there is no free area (NO in step S509), the processing of step S509 is repeated, again. In step S509, the CPU 101 waits until a free area is formed. No free area means that the compression buffer is filled with uncompressed image data that the drawing processing has already been performed on but has not yet been transmitted to the compression processing unit 104.

In step S510, the drawing processing unit 103 then stores the uncompressed image data, on which the compression processing has not been performed, in the compression buffer in the local memory 111 which has been secured in step S405 or S406.

<Use States of Local Memory and RAM>

Figure 6:
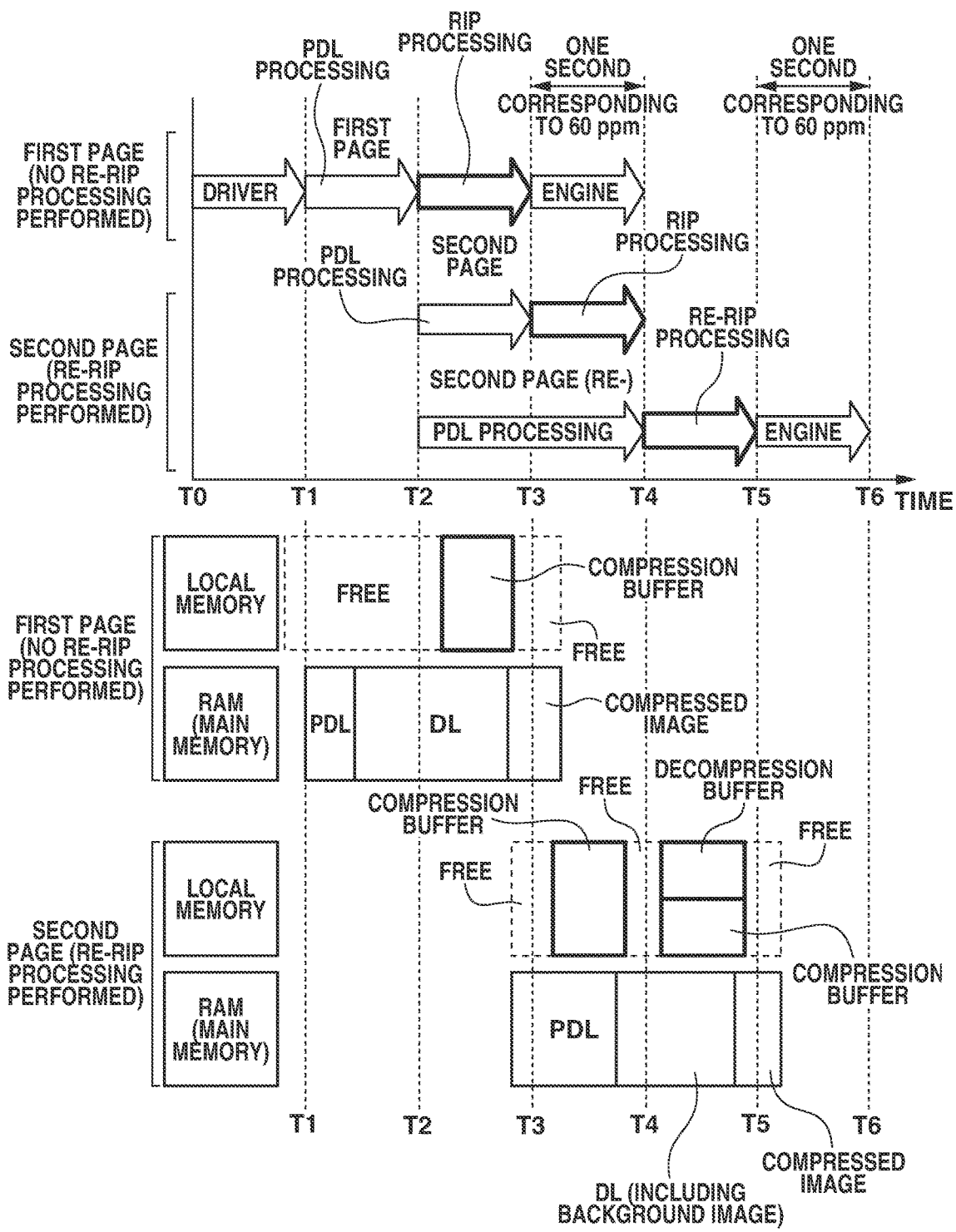
FIG. 6 is a schematic diagram illustrating respective use states of a local memory and a random access memory (RAM) during drawing processing.

Finally, respective use states of the local memory 111 and the RAM 106 during drawing processing in the present exemplary embodiment will be described with reference to a schematic diagram (timing chart) of FIG. 6. FIG. 6 is a timing chart for a period from the time when PDL data, which has been generated by the driver on the host computer or the server, has been received until the time when image data generated in the controller 100 in the image processing apparatus is transmitted to the print engine 400. In FIG. 6, a case where the PDL data includes two pages will be described as an example. On the first page, a memory capacity required on the RAM 106 for drawing data (DL) is smaller than the above described threshold value which can be secured in the entire system, and repetition of drawing processing (i.e., fallback processing) is not required. On the second page, a memory capacity required on the RAM 106 for drawing data (DL) is larger than the above described threshold value which can be secured in the entire system, and repetition of drawing processing (i.e., fallback processing) is required. Under the foregoing condition, an example in which the image processing apparatus according to the present exemplary embodiment determines whether drawing data includes compressed image data by referring to a fallback flag and performs the assignment control of the local memory 111 according to a determination result will be described. Image data of a background image (a drawing object) obtained by fallback processing is compressed image data included in drawing data.

FIG. 6 is a timing chart using a horizontal axis as a time axis, illustrating a processing content of each of the processing units from time T0 to time T6 and respective use states of the local memory 111 and the RAM 106 at each of times T0 to T6. Descriptions here are summarized into the following points. The assignment control of the storage area in the local memory 111 in the present exemplary embodiment is performed after confirming a state (free state) where unprocessed image data has not been stored in the first storage unit 1111 and the second storage unit 1112 (hereinafter merely referred to as the local memory 111). In other words, the assignment control is not performed while the unprocessed image data remains in at least one of the first storage unit 1111 and the second storage unit 1112. More specifically, the assignment control is performed in a free state where no image data has been stored in both the storage units 1111 and 1112, i.e., immediately before the start and immediately after the end of drawing processing for each page.

In a period from time T0 to time T1, the image processing apparatus receives the above described PDL data, which has been generated by the driver on the host computer or the server, via the network I/F 105, and stores the received PDL data in the HDD 108 in the controller 100.

In a period from time T1 to time T2, the CPU 101 interprets the PDL data to generate drawing data (DL) for the first page. In the period from time T1 to time T2, the drawing processing unit 103 does not perform drawing processing. Therefore, the local memory 111 remains unused.

Then, in a period from time T2 to time T3, the drawing processing unit 103 performs drawing processing and the compression processing unit 104 performs compression processing on the first page, and the CPU 101 interprets the PDL data to generate drawing data (DL) for the second page. The PDL data on the second page is stored in the RAM 106 from the HDD 108 after the drawing processing on the drawing data for the first page is completed. Therefore, the CPU 101 attempts to start generation processing on the drawing data for the second page from the time point of time T2. However, the generation processing is actually performed after the PDL data is stored in the RAM 106. In the period from time T2 to time T3, the drawing processing unit 103 performs drawing processing not followed by decompression processing on compressed image data (a background image). Therefore, the local memory 111 is used only as a compression buffer. In other words, at time T2, the CPU 101 detects that the decompression processing on the compressed image data (background image) need not be performed in the period from time T2 to time T3, and performs the drawing processing to secure only the compression buffer in the assignment control of the local memory 111 (an operation mode B). At time T2 at the time of the start of the drawing processing on the first page, uncompressed image data has not been stored in the compression buffer. Therefore, the local memory 111 remains unused (enters a free state). At time T3 at the time of the end of the drawing processing on the first page, uncompressed image data has already been read out of the compression buffer. Therefore, the local memory 111 remains unused.

Then, in a period from time T3 to time T4, the print image processing unit 110 performs print image processing and transmits a processing result to the print engine 400 on the first page. On the other hand, fallback processing is performed on the second page. In other words, the drawing processing unit 103 performs drawing processing, and the compression processing unit 104 performs compression processing. In the period from time T3 to time T4, the drawing processing unit 103 performs drawing processing not followed by decompression processing (fallback processing) on compressed image data (a background image). Therefore, the local memory 111 is used only as a compression buffer. In other words, at time T3, the CPU 101 detects that the decompression processing for the compressed image data (background image) need not be performed in the period from time T3 to time T4, and performs the drawing processing to secure only the compression buffer in the assignment control of the local memory 111. At time T3 at the time of the start of the fallback processing, uncompressed image data has not been stored in the compression buffer. Therefore, the local memory 111 remains unused. At time T4 at the time of the end of the fallback processing, uncompressed image data has already been read out of the compression buffer. Therefore, the local memory 111 remains unused.

Then, in a period from time T4 to time T5, the drawing processing unit 103 performs drawing processing again and the compression processing unit 104 performs compression processing on the second page. In the period from time T4 to time T5, the drawing processing unit 103 performs drawing processing followed by decompression processing for compressed image data (a background image). Therefore, the local memory 111 is used by performing the assignment control as a compression buffer and a decompression buffer. In other words, at time T4, the CPU 101 detects that the decompression processing needs to be performed in the period from T4 to time T5 for the compressed image data (background image) which has been generated in the period from time T3 to time T4, and performs the drawing processing to secure the decompression buffer in the assignment control of the local memory 111. At time T4 at the time of the start of the drawing processing on the second page, uncompressed image data has not been stored in the compression buffer. Therefore, the local memory 111 remains unused (enters a free state). At time T5 at the time of the end of the drawing processing on the second page, uncompressed image data has already been read out of the compression buffer. Therefore, the local memory 111 remains unused.

Finally, in a period from time T5 to time T6, the print image processing unit 110 performs print image processing on the second page and transmits a processing result to the print engine 400.

Thus, at times T3, T4, and T5 between the pages among times T0 to T6, there occurs a state (free state) where uncompressed image data, which has not yet been processed, has not been stored in the decompression buffer and the compression buffer in the local memory 111. Therefore, in the image processing apparatus according to the present exemplary embodiment, the drawing processing unit 103 can change the assignment in the local memory 111 described in FIGS. 2 and 3 at these timings.

As described above, according to the present exemplary embodiment of the present disclosure, it is determined whether the drawing data includes the compressed image data during the PDL printing. If the drawing data includes the compressed image data, control is performed to assign both the decompression buffer and the compression buffer in the local memory 111. On the other hand, if the drawing data does not include the compressed image data, control is performed to assign the compression buffer as a storage area without ensuring the decompression buffer in the local memory 111. Thus, there can be provided an image processing apparatus having an improved cost performance by switching (changing) the assignment of the storage area in a local memory according to a content of drawing data to inhibit costs from increasing with increasing number of local memories.

<Modification>

In the above described exemplary embodiment, the CPU 101 stores the control information in the internal register of the local memory control unit 112, and selects either one of the two operation modes. In addition, there can be an example of an image processing apparatus, described below. Components, which are not particularly described here, are similar to those in the above described exemplary embodiment.

A CPU 101 stores an address range A of a local memory 111, which functions as a decompression buffer, and an address range B of the local memory 111, which functions as a compression buffer, in an internal register of a local memory control unit 112. Then, the local memory control unit 112 sets the address range A of the local memory 111, which can be used as a decompression buffer, for each of the decompression processing unit 102 and a drawing processing unit 103. The local memory control unit 112 sets the address range B of the local memory 111, which can be used as a compression buffer, for each of the drawing processing unit 103 and a compression processing unit 104. The decompression processing unit 102, the drawing processing unit 103, and the compression processing unit 104 respectively perform decompression processing, drawing processing, and compression processing, as needed, while accessing storage areas of the local memory 111 according to the set address ranges.

In the image processing apparatus having such a configuration, the CPU 101, in a case of detecting that drawing data includes compressed image data, performs the following processing. The CPU 101 stores a first address range from an address [XXXX] to an address [YYYY−1] of the local memory 111 as an address range A in the local memory control unit 112. In this case, the CPU 101 stores a second address range from an address [YYYY] to an address [ZZZZ-1] of the local memory 111 as an address range B in the local memory control unit 112.

On the other hand, the CPU 101, in a case of detecting that drawing data does not include compressed image data, stores "Null" indicating that an address range to be set is invalid as an address range A in the local memory control unit 112. In this case, the CPU 101 stores a third address range from an address [XXXX] to an address [ZZZZ-1] of the local memory 111 (the sum of the first address range and the second address range) as an address range B in the local memory control unit 112.

The address ranges A and B in the foregoing modification are examples, and may be address ranges different from the address ranges A and B. If the address ranges (i.e., the memory sizes) of the storage areas respectively used as the decompression buffer and the compression buffer are thus dynamically set under an instruction from the CPU 101, the apparatus according to the present disclosure can be realized.

<Another Exemplary Embodiment>

In the above described exemplary embodiment, it is described based on the assumption that compressed image data in drawing data is a drawing object included as a background image during re-drawing processing or a drawing object such as JPEG embedded during generation of PDL data or drawing data. If the compressed image data in the drawing data is the background image during the re-drawing processing, it is previously known that a page includes only a single drawing object. On the other hand, a picture in a page may include a plurality of drawing objects. A decompression processing unit 102 can also manage drawing data including compressed image data, including the number of pieces of compressed image data in a page simultaneously with the presence or absence of compressed image data. More specifically, if it is detected that the decompression processing unit 102 has completed decompression of all compressed image data during drawing processing, and furthermore, the drawing processing unit 103 has completed reading of all uncompressed image data, the assignment control of the local memory 111 can be changed in the subsequent processing. As a mechanism for implementing this, an internal register retaining the number of drawing objects, which have already been subjected to drawing processing, relative to the number of drawing objects serving as compressed image data in drawing data, may be prepared in the drawing processing unit 103, for example.

As described above, according to each of the exemplary embodiments, it is determined whether the drawing data includes the compressed image data during the PDL printing. If the drawing data includes the compressed image data, control is performed to assign both the decompression buffer and the compression buffer in the local memory 111. Further, if the drawing processing for all the compressed image data for the page serving as a drawing processing target is completed, control is performed to assign the compression buffer as a storage area without ensuring the decompression buffer in the local memory 111 in drawing processing for pages subsequent to the page. Thus, there can be provided an image processing apparatus having an improved cost performance by changing the assignment of a storage area in a local memory so that a required buffer memory can be secured according to a content of drawing data to inhibit costs from increasing with increasing number of local memories. The above described storage capacity of the compression buffer is an example. A storage capacity of the compression buffer secured when the drawing data does not include compression image data may be larger than that of the compression buffer secured when the drawing data includes compression image data.

While the assignment of the storage area in the local memory 111 is controlled in the above described exemplary embodiments, the present invention is not limited to this. More specifically, two physically different local memories, which can be respectively used as a decompression buffer and a compression buffer, may be prepared and configured, as described below, if drawing data does not include compressed image data. The decompression buffer is made accessible from both a drawing processing unit and a compression processing unit, like the compression buffer, and the drawing processing unit stores image data after drawing processing in the decompression buffer and the compression processing unit performs compression processing for the stored image data.

In the above described exemplary embodiments, if the drawing data includes the compressed image data, the decompression buffer and the compression buffer are provided in the local memory 111. On the other hand, if the drawing data does not include the compressed image data, the decompression buffer is not provided in the local memory 111 but the compression buffer is provided in the local memory 111 so that a memory use amount corresponding to the decompression buffer can be used as the compression buffer. The provision of the buffer in the local memory 111 means that a storage area in at least a part of the local memory 111 is configured to function as the buffer, like in the above described exemplary embodiments. In at least one embodiment of the present disclosure, if the drawing data does not include the compressed image data, a memory use amount corresponding to the decompression buffer may be unused as the compression buffer. For example, consider a system configuration in which a processing unit A other than the decompression processing unit 102, the drawing processing unit 103, and the compression processing unit 104 is connected to the local memory 111. If drawing data does not include compressed image data in the system configuration, a memory use amount corresponding to a decompression buffer may be usable by the other processing unit A. In other words, the present disclosure is also applicable to apparatuses or systems, as described below. The present disclosure is applicable to an apparatus or a system that makes a setting to provide a decompression buffer in a local memory 111 if drawing data includes compressed image data and a decompression processing unit 102 needs to decompress the compressed image data. The present disclosure is also applicable to an apparatus or a system which makes a setting to enable a processing unit different from a decompression processing unit 102 to use a memory corresponding to a decompression buffer in a local memory 111 if drawing data does not include compressed image data and the decompression processing unit 102 need not decompress the compressed image data.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-232519, filed Nov. 28, 2015, which is hereby incorporated by reference herein in its entirety.

What is claimed is:

1. An image processing apparatus comprising:
at least one controller having a first memory, a second memory, and at least one processor that operates to execute instructions, the at least one controller configured to:
generate drawing data based on drawing commands;
store the generated drawing data in the first memory;
generate drawn data based on at least the drawing data acquired from the first memory;
store the drawn data in a drawn data buffer area of the second memory;
compress the drawn data acquired from the drawn data buffer area of the second memory;
store, in the first memory, the compressed drawn data acquired from the drawn data buffer area of the second memory;
wherein in a case where compressed image data is included in the drawing data;
the compressed image data is decompressed,
the decompressed data is stored in a decompression buffer area of the second memory, and
the drawn data is generated based on the the drawing data acquired from the first memory and the decompressed data acquired from the decompression buffer area of the second memory;
wherein, in a case where compressed image data is included in the drawing data, the decompression buffer area and the drawn data buffer area having first size are allocated to the second memory; and
wherein, in a case where it is determined that compressed image data is not included in the drawing data, the drawn data buffer area having second size that is larger than the first size is allocated to the second memory.

2. The image processing apparatus according to claim 1, wherein the at least one controller stores, in a case where there is a free space for the drawn data buffer area, the drawn data in the drawn image buffer area, and waits, in a case where there is no free space for the drawn data buffer area, to store the drawn data in the drawing buffer until a free space for the drawn buffer area is formed in the second memory.

3. The image processing apparatus according to claim 1, wherein the at least one controller further operates to:
acquire Page Description Language (PDL) data as the drawing commands;
generate a drawing objects based on the acquired PDL data; and
generate compressed image data on a basis of drawing objects in a case where total data size of drawing objects generated based on the PDL data exceeds predetermined size;
wherein the drawn data is generated on a basis of the compressed image object and a drawing object further generated based on the PDL data.

4. The image processing apparatus according to claim 1, wherein the at least one controller stores setting information for using a part of the second memory as the decompression buffer area and using another part of the second memory as the drawn data buffer area.

5. The image processing apparatus according to claim 1, further comprising a printing device configured to print an image based on the drawn data.

6. The image processing apparatus according to claim 5, wherein the at least one controller further operates to:
transmit image data based on the compressed drawn data in the first memory to the printing device.

7. The image processing apparatus according to claim 6, wherein the at least one controller performs transmission to the printing device after decompressing the compressed drawn data and after performing predetermined image processing on the decompressed drawn data.

8. The image processing apparatus according to claim 1, wherein the at least one controller includes a decompressor circuit that decompresses a compressed data, and the decompressor circuit and the second memory are connected to each other via a signal line.

9. The image processing apparatus according to claim 1, wherein the at least one controller includes a drawing circuit that generates the drawn data, and the drawing circuit and the second memory are connected to each other via a signal line.

10. The image processing apparatus according to claim 1, wherein the at least one controller includes a compressor circuit that compresses data, and the compressor circuit and the second memory are connected to each other via a signal line.

11. The image processing apparatus according to claim 1, wherein the at least one controller further operates to:
generate the compressed image data based on the drawing commands in a case where total data size of generated drawing data exceeds predetermined size;
store information indicating the compressed image data is included in the drawing data, in a case where the compressed image data is generated; and
determine whether the compressed image data is included in the drawing data, based on the stored information;
wherein in a case where it is determined that the compressed image data is included in the drawing data, the decompression buffer area and the drawn data buffer area having first size are allocated to the second memory; and
wherein, in a case where it is determined that compressed image data is not included in the drawing data, the drawn data buffer area having the second size is allocated to the second memory.

12. The image processing apparatus according to claim 11, wherein the information is a fall back flag information.

13. An image processing method comprising:
generating drawing data based on drawing commands;
storing the generated drawing data in a first memory;
generating drawn data based on at least the drawing data acquired from the first memory;
storing the drawn data in a drawn data buffer area of a second memory;
compressing the drawn data acquired from the drawn data buffer area of the second memory;
storing, in the first memory, the compressed drawn data acquired from the drawn data buffer area of the second memory;
wherein in a case where compressed image data is included in the drawing data;
the compressed image data is decompressed,
the decompressed data is stored in a decompression buffer area of the second memory, and
the drawn data is generated based on the drawing data acquired from the first memory and the decompressed data acquired from the decompression buffer area of the second memory;
wherein, in a case where compressed image data is included in the drawing data, the decompression buffer area and the drawn data buffer area of a first size are allocated to the second memory; and
wherein, in a case where it is determined that compressed image data is not included in the drawing data, the drawn data buffer area having a second size that is larger than the first size is allocated to the second memory.

* * * * *